(12) United States Patent
Koponen

(10) Patent No.: US 6,637,482 B2
(45) Date of Patent: Oct. 28, 2003

(54) WOOD HARVESTING METHOD AND A HARVESTER HEAD NEEDED FOR ITS IMPLEMENTATION

(75) Inventor: Kari Koponen, Kuopio (FI)

(73) Assignee: Outokummun Matalli Oy, Outokumpu (FI)

( * ) Notice: Subject to any disclaimer, the term of this patent is extended or adjusted under 35 U.S.C. 154(b) by 0 days.

(21) Appl. No.: 10/080,679

(22) Filed: Feb. 25, 2002

(65) Prior Publication Data

US 2002/0079020 A1 Jun. 27, 2002

Related U.S. Application Data

(63) Continuation of application No. 09/620,232, filed on Jul. 20, 2000, now abandoned, which is a continuation of application No. PCT/FI99/00034, filed on Jan. 20, 1999.

(30) Foreign Application Priority Data

Jan. 20, 1998 (FI) .................................................. 980114

(51) Int. Cl.⁷ .......................... A01G 23/08; A01G 23/095
(52) U.S. Cl. ..................... 144/338; 144/4.1; 144/24.13; 144/336; 144/343
(58) Field of Search .............................. 144/4.1, 24.13, 144/34.5, 335, 336, 338, 343, 357, 382, 402

(56) References Cited

U.S. PATENT DOCUMENTS

| | | | | |
|---|---|---|---|---|
| 4,175,598 A | * | 11/1979 | Stoychoff | 144/34.5 |
| 4,243,258 A | * | 1/1981 | Dauwalder | 144/34.5 |
| 4,779,654 A | * | 10/1988 | Casperson et al. | 144/338 |
| 4,981,163 A | * | 1/1991 | Westlund | 144/24.13 |
| 5,004,026 A | * | 4/1991 | MacLennan et al. | 144/4.1 |
| 5,109,900 A | * | 5/1992 | Gilbert | 144/34.5 |
| 6,374,877 B1 | * | 4/2002 | Wildey | 144/4.1 |
| 6,382,274 B1 | * | 5/2002 | Hicks | 144/34.1 |

* cited by examiner

Primary Examiner—W. Donald Bray
(74) Attorney, Agent, or Firm—Pillsbury Winthrop LLP

(57) ABSTRACT

The innovation concerns a wood harvesting method and a harvester head. The method is used to harvest all sizes of trees without to take the harvester to the site more than once. The method consists of placing the harvester head against the first tree, closing all grapples around the tree, cutting the tree with the cutting device, lifting the cut tree a little by holding it with the grapples fastened to the telescopic boom and using the stroke cylinder to move the telescopic boom in relation to the main body, moving to the next tree, opening the rigid grapples and holding the first tree in an upright position with the articulated grapples, closing the rigid grapples around the tree, opening the articulated grapples, so that their turning tips slide away from between the trees, closing the articulated grapples around all the trees, cutting the tree with the cutting device, and continuing the work in the above described order by collecting more trees and cutting them, until the grapples are full. The harvester head includes the main body, telescopic boom moving in relation the main body, a device for cutting trees and several pairs of grapples for holding the trees, with at least one pair of grapples equipped with articulated grapples.

6 Claims, 1 Drawing Sheet

WOOD HARVESTING METHOD AND A HARVESTER HEAD NEEDED FOR ITS IMPLEMENTATION

This is a Continuation of National application Ser. No. 09/620,232 filed Jul. 20, 2000 now abandoned which was a continuation of International Application No. PCT/FI99/00034 filed Jan. 20, 1999 which designated the U.S.

This invention concerns a wood harvesting method used in forest work, defined in the introductory part of the patent claim. It also concerns the harvester head used for the implementation of this method which is described in the introductory part of the first patent claim for the device.

BACKGROUND OF THE INVENTION

The typical Nordic wood harvesting chain utilises efficient methods that are mainly useful and most economical when harvesting timber trees. These methods make use of big multipurpose machines as the basic machines. These machines are indeed very efficient in processing single timber trees.

However, wood harvesting is not just harvesting timber trees. The harvesting of props, for example, is not nearly as cost-effective as timber harvesting when these traditional methods and machines are used, because the price received for props is lower, and the volume per tree is smaller.

In the conventional work with a multipurpose machine, not enough attention has been paid to the harvesting of fuel wood. Fuel wood is often actually rolled into the soil with a machine As regards cost-effectiveness, this is quite understandable, but it still leads to economical waste. In the same way, the first thinning is often completely neglected when using today's methods and equipment, because it brings no momentary profit.

Some investments have been made in order to develop harvesting methods and equipment for fuel wood alone, but these are economically not very competitive, due to various reasons. Besides, they are unable to handle logs and possibly props as well.

BRIEF SUMMARY OF THE INVENTION

The invention is targeted at bringing up a wood harvesting method and a harvester head capable of eliminating some bad sides of the above-mentioned harvesting methods. In particular, the aim is to introduce a method and a harvester head which make it possible to harvest props or fuel wood in bunches, so that the lack of efficiency due to the small size of a single tree is no more an issue. In addition, our goal is to introduce a harvester head that can also be used for harvesting timber trees one at a time.

The objective of the invention can be reached by utilising the method and the harvester head, which are characterised by the features presented in the parts of the patent claims describing the characteristic features of the invention.

When using the method suggested in the invention, the harvesting in bunches includes at least the following work phases essentially in this order: place the harvester head against the first tree with all the grapples open, close all the grapples around the first tree, cut the tree with the cutting device, lift the cut tree a little by holding it with the grapples fastened to a telescopic boom and using the stroke cylinder to move the telescopic boom in relation to the main body of the machine Holding the tree in an upright position, move to the next tree to be cut, place the harvester head close to the second tree, open the rigid grapples while holding the first tree up with the articulated grapples, and close the rigid grapples around the second tree The articulated grapples are thus left between the first and the second tree. Now open the articulated grapples, so that their turning tips are essentially forceless and can therefore easily slip away from between the trees, close the articulated grapples around all the trees and cut the second tree with the cutting device. Lift the cut trees a little by holding them with the grapples fastened to the telescopic boom and by using the stroke cylinder to move the telescopic boom in relation to the main body of the machine. After this, continue working in the above-described order, cutting and collecting more trees, until the grapples are full. In the end, the full grapple of wood is processed further according to current needs and/or loaded to an intermediate depot, on a transporting vehicle or to a device for further processing This method is very useful, in order to harvest the trees in bunches effectively and reliably.

The above-described method makes it possible to fell all trees to be used from a forest holding during a single visit of a harvester, regardless of the sizes of the trees when the versatile and effective harvesting equipment, as described in the invention, is available.

When applying the invention cost-efficiently, the branches of the trees are delimbed or bent from the outside with the grapples equipped with cutting blades by using the stroke cylinder to move the telescopic boom in relation to the main body of the machine and holding the trees with the other grapples. Thus, the bunch of trees requires less space and is therefore easier to transport.

BRIEF DESCRIPTION OF THE DRAWINGS

Next we will consider one cost-efficient application of the invention, referring to the enclosed drawings. To describe the method accurately, we will first present one harvester version according to the invention. To simplify the pictures, a large number of usual components, such as hydraulic valves and hoses, has been left out. Similarly, not much attention is paid to the electric control devices of the equipment, because they form a part of the conventional structure. In the drawings, FIG. 1 describes the harvester head from the side, in a horizontal position. This position is used when delimbing and cutting trees.

DETAILED DESCRIPTION OF THE INVENTION

Figure 1:
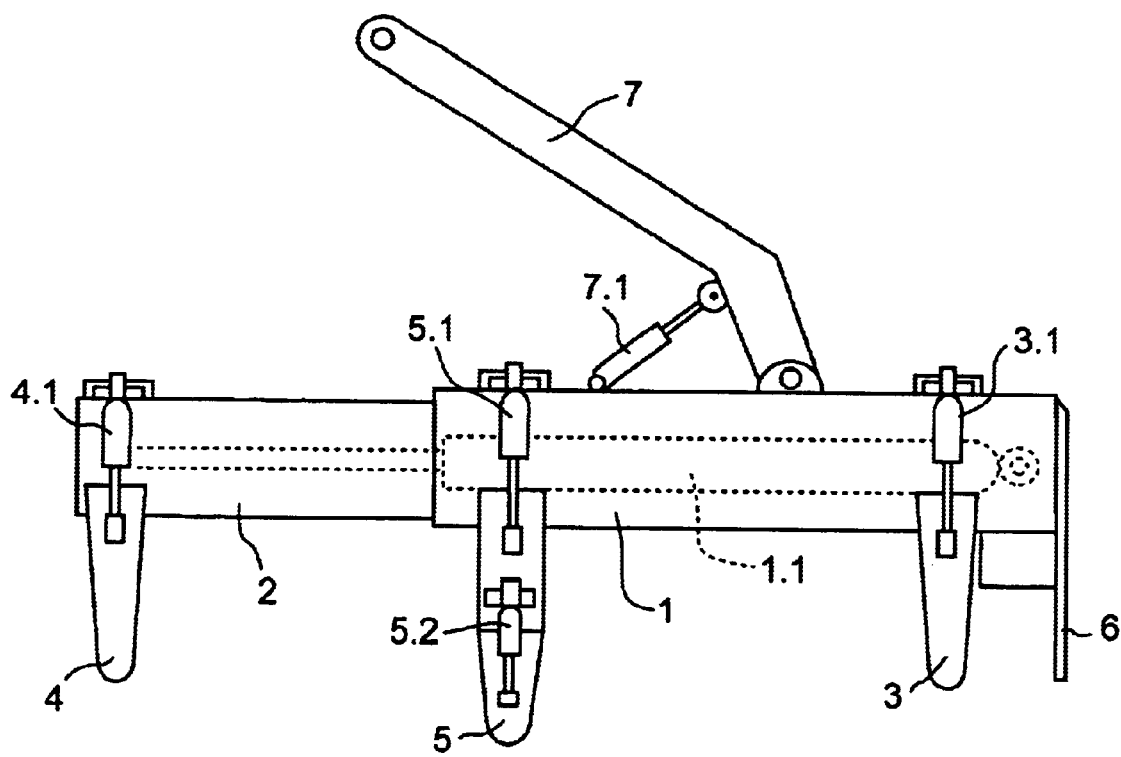
Figure 2:
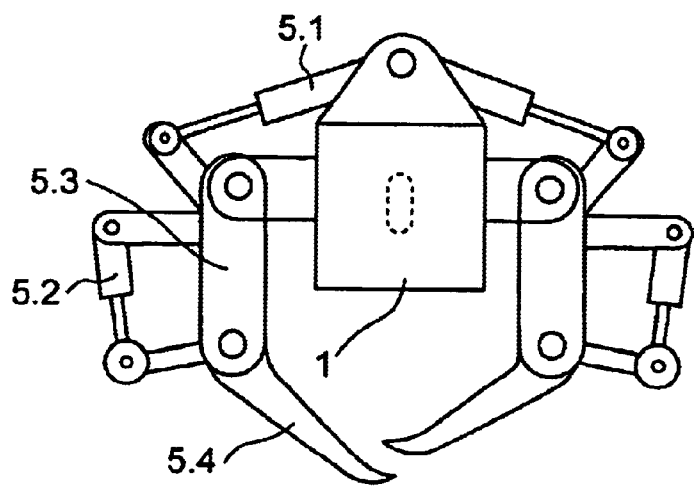
FIG. 2 is a cross-section of the harvester head from the location of the articulated grapples. For clarity, the forms in the back part have not been described

Number 1 refers to the main body of the harvester head, and number 1.1 is the integrated stroke cylinder. Number 2 refers to the telescopic boom, which has been fitted with a bearing, so that it slides inside the main body 1 and in relation to it, assisted by the stroke cylinder 1.1. Number 3 refers to the tong grapples and 3.1 to their hydraulic cylinders. The tong grapples are fastened to the main body 1

Number 4 refers to the grapples with cutting blades and 4.1 to their cylinders. These so-called cutting knives are fastened to the telescopic boom 2.

Number 5 refers to the articulated grapples. The articulated grapples consist of the bottom parts 5.3 and the tips 5.4 fastened to them. The hydraulic cylinders 5.1 move the bottom parts of the articulated grapples. The tips of the grapples are moved by separate hydraulic cylinders 5.2. The bottom parts 5.3 of the articulated grapples 5 are fastened to the main body 1 of the machine.

Number 6 refers to the sawing device. It is a conveniently normal chainsaw with a hydraulic engine or any other suitable cutting device.

Number 7 refers to the suspension shaft used to fasten the harvester head to the basic machine, a suitable largish chopping machine. The tilt cylinder 7.1 has been fastened to the suspension shaft as well as to the main body, and it controls the inclination of the harvester head or keeps it straight, depending on the work phase at hand.

Each pair of grapples 3, 4, 5 has been guided to operate independently by the electrohydraulic valves 3.1, 4.1, 5.1 and 5.2, which makes it possible to close and/or release them independently of each other. In addition, the harvester head includes an electric control device, which has been built and/or programmed to group the pairs of grapples 3, 4, 5 and to control their operations.

The working with the harvester head according to the invented method is carried out as follows:

When felling the first tree, the harvester head is placed against the trunk of the tree, with all grapples 3, 4, 5 open. The grapples 3, 4, 5 are closed around the tree and the tree is cut from the butt with the sawing device 6 of the harvester head. Even when cut, the tree is kept in an upright position with the hydraulics of the basic machine and the tilt cylinder 7.1 of the harvester head.

After the sawing, the cutting knives 4 are used to lift the tree by moving the telescopic boom 2 a bit upwards with the stroke cylinder 1.1, so that the butt of the first tree won't cause any resistance when sawing the next tree. The lifting height can be chosen freely. The other grapples 3, 5 are loosened momentarily to enable the lifting.

Then the machine is moved to the second tree to be felled. In this phase, the first tree is temporarily only fastened to the articulated grapples 5, and the rigid grapples 3, 4 are open. The second tree is placed against the first tree with the rigid grapples 3, 4. The articulated grapples 5 are pulled open, and their tips 5.4 are moved away from between the first and the second tree. This is carried out by relaxing the tips 5.4 of the grapples by removing the hydraulic pressure from the cylinders 5.2 in the tips and moving the articulated grapples 5 with the cylinder 5.1 of the bottom parts. The tips 5.4 of the grapples 5 can be turned, so that it is possible to get them away from between the tree collected last and the previous trees.

The articulated grapples 5 are closed around both trees, and the second tree is sawed.

Immediately after the sawing, both trees are lifted as much as necessary with the cutting knives 4, assisted by the stroke cylinder 1.1

The machine is moved to the next tree to be felled. In this phase, the first and the second tree are held by the articulated grapples 5. The next tree is placed against the previous trees with the rigid grapples 3, 4. The work continues as described above, until the grapples 3, 4, 5 are full. The time it takes for all the grapples to be filled depends on the size of the harvested trees.

In order to form a compact load for transportation, the bunch of trees is delimbed or their branches are bent with the cutting knives 4 in the direction of the trunks. The bunch is held with the other grapples 3, 4, and the stroke cylinder 1.1 is used to bring about the relative movement between the bunch of trees and the cutting knives by moving the telescopic boom in relation to the main body. By changing the grip, even long bunches can be handled in the way described above. The delimbing direction (top/butt) can be chosen according to each situation.

The full grapple of wood is processed further according to current needs. The bunch of trees is moved to a suitable place by a logging road or on a transportation vehicle or for example to a chopping machine or another device used for further processing.

Usually, a bunch consists of several smallish trees, but when necessary a bunch can only include one single tree, when the tree is cut near its top. When a timber tree is concerned, the tree is delimbed alone with the cutting knives, by using the stroke cylinder to move the telescopic boom in the way described above. After this, the cutting device is employed to cut the tree into logs of desired sizes The trunk of the tree is moved longitudinally, holding it with the cutting knives 4 and supporting it with the other grapples 3, 5.

Working with the harvester head according to the invention when making props is not much different from the work carried out when using a conventional harvester head, as long as the trees are big enough to require processing one at a time. When the props are small enough to enable processing in bunches, the work is very similar to the processing in bunches as described above. The precision demands in the delimbing of props may cause a need to process the trees one at a time during the delimbing. However, it is still possible to collect them in bunches.

The processing of timber trees is very close to the conventional work even with this harvester head. The head can be equipped with all kinds of existing automatic measuring devices, in order to calculate the volume and other values connected to the trees.

It is, besides, very normal for the automation level of the equipment to vary in different implementations. For example, the small lift after the sawing is easily automated and brings clear convenience to the operator of the machine. There are also different variations that can be seen in the structure and arrangements of the equipment. These are, however, included in the enclosed patent claims and in the innovative idea defined in them.

What is claimed is:

1. A wood harvesting method used to harvest trees from a forest site without having to bring a harvester to the site more than once, to bunch trees in the harvester's grapple by using grapples fastened to the harvester and to cut them with a cutting device fastened to the harvester, two of said grapples being rigid and another grapple being articulated, said method comprising using at least the following work phases in the harvesting in bunches, essentially in the following order:

place the harvester head against a first tree with all grapples open, close all the grapples around the first tree, cut the first tree with the cutting device, lift the cut first tree, holding the cut first tree with the grapples fastened to a telescopic boom and using a stroke cylinder to move the telescopic boom in relation to a main body, move to the next tree to be cut, holding the cut first tree in an upright position, take the harvester head close to the second tree, open the rigid grapples and keep the cut first tree in an upright position with the articulated grapples, close the rigid grapples around the second tree, which leaves the articulated grapples between the cut first tree and the second tree, open the articulated grapples, so that turning tips of the articulated grapples can slide away from between trees, close the articulated grapples around all trees, cut the second tree with the cutting device, lift the cut first and second trees, holding them with the grapples fastened to the telescopic boom and using the stroke cylinder to move the telescopic boom in relation to the main body, continue working in the above described order, cutting and collecting more trees, until the grapples are full, after which all grappled cut trees are at least one of processed further and loaded to an intermediary depot, on a transporting vehicle or to a device for further processing.

2. A method according to claim 1, wherein in order to improve transportation density, branches of the trees are delimbed or bent from an outside of a bunch with the grapples equipped with cutting blades, by using the stroke cylinder to move the telescopic boom in relation to the main body, and holding the trees with the other grapples.

3. A method according to claim 1, wherein at least one pair of grapples moves bottom parts and tips of the grapples with hydraulic cylinders independently of each other.

4. A harvester head, comprising:

a main body, a device for cutting trees and several pairs of grapples for holding a tree, a telescopic boom movable in relation to the body, and at least one pair of grapples equipped with articulated grapples with bottom parts and tips and hydraulic cylinders for moving the bottom parts and the tips independently of each other.

5. A harvester head according to claim 4, wherein at least one pair of grapples is equipped with cuffing blades.

6. A harvester head according to claim 4, wherein at least one pair of grapples is fastened to the telescopic boom and at least one pair of grapples is fastened to the body.

* * * * *